(12) United States Patent
Akamine et al.

(10) Patent No.: US 9,938,195 B2
(45) Date of Patent: Apr. 10, 2018

(54) HEAT INSULATING MATERIAL CONTAINING A POROUS SINTERED BODY FORMED OF MGAL$_2$O$_4$

(71) Applicant: COORSTEK KK, Shinagawa-ku, Tokyo (JP)

(72) Inventors: Shuko Akamine, Hadano (JP); Mitsuhiro Fujita, Hadano (JP)

(73) Assignee: COORSTEK KK, Shinagawa-Ku, Tokyo (JP)

( * ) Notice: Subject to any disclaimer, the term of this patent is extended or adjusted under 35 U.S.C. 154(b) by 55 days.

(21) Appl. No.: 14/747,020

(22) Filed: Jun. 23, 2015

(65) Prior Publication Data

US 2015/0368118 A1 Dec. 24, 2015

(30) Foreign Application Priority Data

| Jun. 24, 2014 | (JP) | 2014-128735 |
| Nov. 7, 2014 | (JP) | 2014-226887 |
| May 1, 2015 | (JP) | 2015-093775 |
| May 1, 2015 | (JP) | 2015-093776 |

(51) Int. Cl.

| *C04B 38/00* | (2006.01) |
| *C04B 35/443* | (2006.01) |
| *C04B 35/634* | (2006.01) |
| *C04B 38/06* | (2006.01) |
| *F16L 59/02* | (2006.01) |
| *F16L 59/00* | (2006.01) |
| *C04B 111/27* | (2006.01) |

(52) U.S. Cl.
CPC .......... *C04B 35/443* (2013.01); *C04B 35/634* (2013.01); *C04B 38/0615* (2013.01); *C04B 2111/27* (2013.01); *C04B 2235/602* (2013.01); *F16L 59/00* (2013.01); *F16L 59/028* (2013.01)

(58) Field of Classification Search
CPC ............ C04B 38/0054; C04B 38/0615; C04B 38/0074; C01F 7/47; F16L 59/028
USPC .......................................... 423/600; 501/120
See application file for complete search history.

(56) References Cited

U.S. PATENT DOCUMENTS

| 3,755,204 A | * | 8/1973 | Sergeys | ................. B01D 53/86 422/180 |
| 5,208,193 A | * | 5/1993 | Smyth | ..................... C04B 35/01 501/120 |
| 2014/0112861 A1 | | 4/2014 | Akamine et al. | |

FOREIGN PATENT DOCUMENTS

| DE | 102013216912 A1 | 5/2014 |
| JP | 2009-299893 A | 12/2009 |
| JP | 2012-229139 A | 11/2012 |
| JP | 2013-209278 A | 10/2013 |
| WO | 02/081868 | * 10/2002 |

* cited by examiner

*Primary Examiner* — Steven J Bos
(74) *Attorney, Agent, or Firm* — Buchanan, Ingersoll & Rooney PC

(57) ABSTRACT

A heat insulating material includes a porous sintered body formed of MgAl$_2$O$_4$ and having a porosity of 60% or more and less than 73%. In the heat insulating material, pores having a pore diameter of 0.8 μm or more and less than 10 μm occupy 30 vol % or more and less than 90 vol % of a total pore volume, pores having a pore diameter of 0.01 μm or more and less than 0.8 μm occupy 10 vol % or more and less than 60 vol % of the total pore volume, the thermal conductivity at 20° C. or higher and 1500° C. or lower is 0.45 W/(m·K) or less, and the compressive strength is 2 MPa or more.

4 Claims, 2 Drawing Sheets

HEAT INSULATING MATERIAL CONTAINING A POROUS SINTERED BODY FORMED OF MGAL$_2$O$_4$

BACKGROUND OF THE INVENTION

Technical Field

The present invention relates to a heat insulating material including a porous sintered body of MgAl$_2$O$_4$ and having excellent heat insulating performance at a high temperature of 1000° C. or higher.

Description of the Related Art

The heat insulating material is required to have low thermal conductivity. A fiber-based heat insulating material such as glass fiber, ceramics having a low bulk density, such as a ceramic porous body, or the like is generally used. A heat transfer factor having an influence on the thermal conductivity can be considered by dividing the heat transfer factor into solid heat transfer, gas heat transfer, and radiation heat transfer.

For example, JP 2009-299893 A describes a fiber-based heat insulating material including a fiber material filled with aerogel. In the fiber-based heat insulating material, a heat insulating layer including an infrared reflection agent is coated with a porous coating layer to suppress the radiation heat transfer.

However, such a heat insulating material mainly contains silica aerogel, has low heat resistance, and has unknown thermal conductivity at a high temperature of 400° C. or higher.

On the other hand, in the ceramic porous body, the solid heat transfer is suppressed and the thermal conductivity is reduced by making the porosity of the ceramic porous body high.

However, an influence by the radiation heat transfer is large at a high temperature of 400° C. or higher. Therefore, in the heat insulating material to be used in such a high temperature region, the radiation heat transfer has been suppressed by adding a material having a high radiation rate, such as a metal oxide of zirconia, titania, or the like, and silicon carbide.

Furthermore, the present inventors have proposed that a spinel ceramic porous body having a predetermined pore-diameter distribution can suppress the solid heat transfer and the radiation heat transfer and can be used as a heat insulating material having excellent heat resistance at a high temperature of 1000° C. or higher (for example, refer to JP 2012-229139 A and JP 2013-209278 A).

JP 2012-229139 A or JP 2013-209278 A discloses, for example, that the spinel ceramic porous body having a predetermined pore-diameter distribution can suppress conductive heat transfer and the radiation heat transfer and can be thereby used as the heat insulating material having excellent heat resistance at a high temperature of 1000° C. or higher.

The spinel ceramic porous body described in JP 2012-229139 A or JP 2013-209278 A has heat resistance at a temperature of 1000° C. or higher which is higher than that in the related art. However, the spinel ceramic porous body described in JP 2012-229139 A or JP 2013-209278 A has a heat-resistant temperature of 1600° C. at most and compressive strength of about 0.8 MPa as long as disclosed.

Recently, a heat insulating material having higher performance has been needed. A heat insulating material having heat resistance, high strength, low thermal conductivity, and the heat insulating performance maintained even at a higher temperature of about 1800° C. has been desired. That is, for example, even a heat insulating material having excellent heat resistance and low thermal conductivity may be required to have more strength.

SUMMARY OF THE INVENTION

The present invention has been accomplished in view of the above-described technical problems. An object of the present invention is to provide a heat insulating material having excellent heat resistance and high strength even at 1800° C., having thermal conductivity an increase of which is suppressed and having excellent heat insulating performance maintained even at a high temperature of 1000° C. or higher, as a heat insulating material having better heat insulating characteristics than that in the related art. That is, the object of the present invention is to provide the heat insulating material having thermal conductivity the increase of which is suppressed, having excellent heat insulating performance maintained, and having higher strength even at a high temperature of 1000° C. or higher.

A heat insulating material of the present invention includes a porous sintered body formed of MgAl$_2$O$_4$ and having a porosity of 60% or more and less than 73%. In the heat insulating material of the present invention, pores having a pore diameter of 0.8 μm or more and less than 10 μm occupy 30 vol % or more and less than 90 vol % of a total pore volume, pores having a pore diameter of 0.01 μm or more and less than 0.8 μm occupy 10 vol % or more and less than 60 vol % of the total pore volume, the thermal conductivity at 20° C. or higher and 1500° C. or lower is 0.45 W/(m·K) or less, and the compressive strength is 2 MPa or more.

In the heat insulating material, preferably, the pores having a pore diameter of 0.8 μm or more and less than 10 μm occupy 70 vol % or more and less than 90 vol % of the total pore volume, the pores having a pore diameter of 0.01 μm or more and less than 0.8 μm occupy 10 vol % or more and less than 20 vol % of the total pore volume, the thermal conductivity at 20° C. or higher and 1500° C. or lower is 0.40 W/(m·K) or less, and the thermal conductivity at 1000° C. or higher and 1500° C. or lower does not exceed 1.5 times the thermal conductivity at 20° C. or higher and lower than 1000° C.

The porous sintered body having such a pore structure is suitable as a heat insulating material having thermal conductivity the increase of which is suppressed even at a high temperature of 1000° C. or higher and 1500° C. or lower and having the heat resistance and the compressive strength maintained even at 1800° C.

The heat insulating material has compressive strength of 2 MPa or more.

The heat insulating material having compressive strength at such a degree is suitable for purposes requiring high strength at a high temperature.

In the heat insulating material, the lower the thermal conductivity at a high temperature is, the better a heat insulating effect to be obtained is. Therefore, the thermal conductivity at 1000° C. or higher and 1500° C. or lower is 0.45 W/(m·K) or less, preferably 0.40 W/(m·K) or less.

In addition, the more the increase of the thermal conductivity at a high temperature is suppressed, the better the heat insulating effect to be obtained is even in a high temperature region. Therefore, preferably, the thermal conductivity at 1000° C. or higher and 1500° C. or lower does not exceed 1.2 times the thermal conductivity at 20° C. or higher and 1000° C. or lower.

In the heat insulating material, preferably, the pores having a pore diameter of 0.8 μm or more and less than 10 μm occupy 30 vol % or more and less than 60 vol % of the total pore volume, the pores having a pore diameter of 0.01 μm or more and less than 0.8 μm occupy 30 vol % or more and less than 60 vol % of the total pore volume, the thermal conductivity at 20° C. or higher and 1500° C. or lower is 0.40 W/(m·K) or less, and the thermal conductivity at 1000° C. or higher and 1500° C. or lower does not exceed 1.5 times the thermal conductivity at 20° C. or higher and lower than 1000° C.

The porous sintered body having such a pore structure is suitable as a heat insulating material having thermal conductivity the increase of which is suppressed and having compressive strength improved even at a high temperature of 1000° C. or higher and 1500° C. or lower.

The heat insulating material has compressive strength of 2 MPa or more. The heat insulating material having compressive strength at such a degree is suitable for purposes requiring high strength at a high temperature.

In the heat insulating material, the lower the thermal conductivity at a high temperature is, the better the heat insulating effect to be obtained is. Therefore, the thermal conductivity at 1000° C. or higher and 1500° C. or lower is 0.45 W/(m·K) or less, preferably 0.40 W/(m·K) or less.

In addition, the more the increase of the thermal conductivity at a high temperature is suppressed, the better the heat insulating effect to be obtained is even in a high temperature region. Therefore, preferably, the thermal conductivity at 1000° C. or higher and 1500° C. or lower does not exceed 1.2 times the thermal conductivity at 20° C. or higher and 1000° C. or lower.

The heat insulating material of the present invention has better heat insulating characteristics than that in the related art. The heat insulating material of the present invention has excellent heat resistance and compressive strength improved even at 1800° C., has thermal conductivity the increase of which is suppressed, and has excellent heat insulating performance maintained even at a high temperature of 1000° C. or higher. Therefore, the heat insulating material of the present invention is suitable as a heat insulating material to be used in a high temperature region. That is, the heat insulating material of the present invention has better heat insulating characteristics than that in the related art. The heat insulating material of the present invention has thermal conductivity the increase of which is suppressed, and has excellent heat insulating performance maintained and compressive strength improved even at a high temperature of 1000° C. or higher. Therefore, the heat insulating material of the present invention is suitable as a heat insulating material to be used in a high temperature region.

Therefore, the heat insulating material of the present invention can be applied suitably also to various structural materials requiring high heat insulating performance at a high temperature around 1800° C., a fireproof material, and a furnace material such as ceramics, glass, iron and steel, or non-ferrous metal.

DESCRIPTION OF THE PREFERRED EMBODIMENTS

Figure 1:
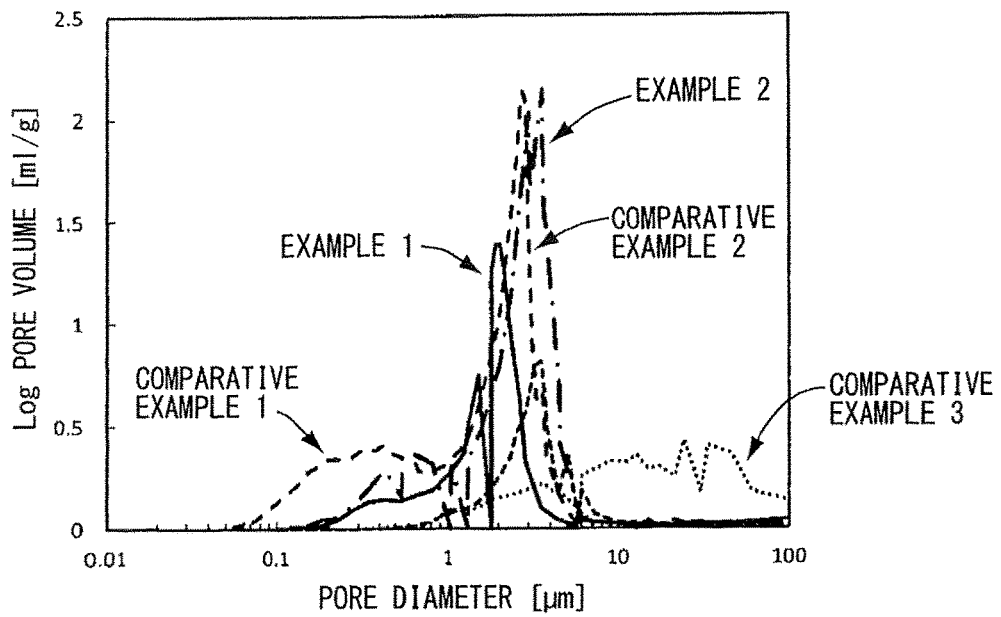
FIG. 1 is a graph illustrating a pore-diameter distribution of each of porous sintered bodies or a heat insulating brick according to Examples and Comparative Examples, measured by a mercury porosimeter.

Hereinafter, the present invention will be described in more detail.

A heat insulating material according to an embodiment of the present invention is a heat insulating material including a porous sintered body formed of $MgAl_2O_4$ and having a porosity of 60% or more and less than 73%. In the heat insulating material, pores having a pore diameter of 0.8 μm or more and less than 10 μm occupy 30 vol % or more and less than 90 vol % of a total pore volume, pores having a pore diameter of 0.01 μm or more and less than 0.8 μm occupy 10 vol % or more and less than 60 vol % of the total pore volume, the thermal conductivity at 20° C. or higher and 1500° C. or lower is 0.45 W/(m·K) or less, and the compressive strength is 2 MPa or more.

The heat insulating material according to the embodiment of the present invention includes a porous sintered body formed of $MgAl_2O_4$ and having a porosity of 60% or more and less than 73%. In the heat insulating material, preferably, the pores having a pore diameter of 0.8 μm or more and less than 10 μm occupy 70 vol % or more and less than 90 vol % of the total pore volume, the pores having a pore diameter of 0.01 μm or more and less than 0.8 μm occupy 10 vol % or more and less than 20 vol % of the total pore volume, the thermal conductivity at 1000° C. or higher and 1500° C. or lower does not exceed 1.5 times the thermal conductivity at 20° C. or higher and lower than 1000° C.

The present invention is based on finding that specific fine pores have an influence on heat resistance and heat insulating performance in a high temperature region by focusing on a pore structure of the porous sintered body. That is, the heat insulating material according to the embodiment of the present invention can maintain the heat resistance and have compressive strength improved even at 1800° C., has thermal conductivity an increase of which is suppressed, and can maintain excellent heat insulating performance even at a high temperature of 1000° C. or higher by controlling an amount of the specific fine pores in the porous sintered body formed of $MgAl_2O_4$.

Therefore, the heat insulating material according to the embodiment of the present invention has heat resistance and compressive strength better than that in the related art. In addition, the heat insulating material according to the embodiment of the present invention has higher heat insulating performance than a heat insulating material having the same thickness, and can contribute to energy-saving.

For example, when the heat insulating material is applied to a large equipment such as a furnace wall, sufficient strength and heat insulating performance can be obtained even when the heat insulating material is thin. Space for the equipment can be saved. In addition, by reducing a surface area of a furnace body, it is also possible to reduce a heat radiation amount from the surface of the furnace body. Furthermore, the heat insulating material has low thermal capacity. Therefore, the heat insulating material can save energy more than a heat insulating brick in the related art.

The heat insulating material according to the embodiment of the present invention is formed of spinel $MgAl_2O_4$.

The spinel porous sintered body has high heat resistance and excellent strength at a high temperature. Therefore, the spinel porous sintered body can reduce change in a shape or a size of a pore generated by particle growth and bonding of grain boundaries at a high temperature, and can maintain an effect of suppressing change in the thermal conductivity for a long period of time. Particularly, $MgAl_2O_4$, that is, magnesia-spinel has high structural stability and an isotropic crystal structure in a high temperature region of 1000° C. or higher. Therefore, $MgAl_2O_4$ does not cause abnormal particle growth or contraction even when exposed to a high temperature. Therefore, $MgAl_2O_4$ can maintain a specific pore structure which is a characteristic of the present invention, and is a suitable material for a heat insulating material used at a high temperature.

The above-described chemical composition and spinel structure can be measured and identified, for example, by powder X-ray diffractometry.

It is assumed that the porosity of the porous sintered body formed of $MgAl_2O_4$ included in the heat insulating material according to the embodiment of the present invention is 60% or more and less than 73%.

When the porosity is less than 60%, a ratio occupied by $MgAl_2O_4$ in the porous sintered body is high. Therefore, solid heat transfer is increased, and the thermal conductivity may not be easily lowered. On the other hand, when the porosity is 73% or more, the ratio occupied by $MgAl_2O_4$ in the porous sintered body is relatively low. Therefore, the porous sintered body is fragile and sufficient heat resistance may not be obtained.

The porosity is calculated according to JIS R 2614 "Testing method for specific gravity and true porosity of insulating fire bricks".

In the pore structure of the porous sintered body, the pores having a pore diameter of 0.8 μm or more and less than 10 μm occupy 30 vol % or more and less than 90 vol %, preferably 70 vol % or more and less than 90 vol %, of the total pore volume, the pores having a pore diameter of 0.01 μm or more and less than 0.8 μm occupy 10 vol % or more and less than 60 vol %, preferably 10 vol % or more and less than 20 vol % of the total pore volume.

As described above, most of the pores of the porous sintered body are small pores having a pore diameter of less than 10 μm. When there are many pores having a pore diameter of 10 μm or more, a scattering effect of infrared rays may be reduced, an influence by radiation heat transfer may be increased, a sufficient heat insulating effect may not be obtained at a high temperature, and the strength of the heat insulating material may be lowered.

The porous sintered body preferably has at least one peak of a pore-diameter distribution in a range of the pore diameter of 0.8 μm or more and less than 10 μm.

It is assumed that, in the heat insulating material, particularly of the pores of the porous sintered body, the pores having a pore diameter of 0.01 μm or more and less than 0.8 μm (fine pores) occupy 10 vol % or more and less than 60 vol %, preferably 10 vol % or more and less than 20 vol %, of the total pore volume.

Such fine pores exist at the above-described ratio, and the number of pores per unit volume can be thereby increased and the scattering effect of infrared rays can be enhanced. Particularly, the existence of the fine pores at the above-described ratio is effective for suppressing the radiation heat transfer having a large influence on the thermal conductivity in a high temperature region, and can also suppress the increase in the thermal conductivity at a high temperature. An excellent heat insulating effect is obtained.

When the ratio occupied by the fine pores in the total pore volume is less than 10 vol %, the number of pores per unit volume is small and the scattering effect of infrared rays may not be sufficiently obtained. On the other hand, the ratio occupied by the fine pores in the total pore volume is 60 vol % or more, specifically 20 vol % or more, the strength of the heat insulating material may be lowered.

The pore-diameter distribution in the porous sintered body can be measured according to JIS R 1655 "Test methods for pore-diameter distribution of fine ceramic green body by mercury porosimetry".

It is assumed that the thermal conductivity of the heat insulating material, specifically the thermal conductivity at 1000° C. or higher and 1500° C. or lower does not exceed 1.5 times, preferably 1.2 times the thermal conductivity at 20° C. or higher and lower than 1000° C.

In this way, the heat insulating material having thermal conductivity the increase of which is suppressed in a high temperature region maintains, in a high temperature region of 1000° C. or higher, a heat insulating effect equivalent to that at a lower temperature, and can be applied suitably even in the high temperature region.

In addition, in the heat insulating material, the thermal conductivity in a high temperature region of 1000° C. or higher and 1500° C. or lower is 0.45 W/(m·K) or less, preferably 0.40 W/(m·K) or less.

Such a heat insulating material in which the thermal conductivity is not increased but suppressed even at a high temperature of 1000° C. or higher has a heat insulating effect with small change even at a high temperature, and can be used suitably.

There is no problem even if a peak of the pore-diameter distribution exists in a range of the pore diameter of 10 μm or more. However, a large pore deteriorates heat insulating performance because of the radiation heat transfer. Therefore, existence of a pore having a pore diameter of more than 1000 μm is not preferable.

With such a pore-diameter distribution, a heat insulating material having strength maintained and having low thermal conductivity with small contribution by the solid heat transfer can be obtained.

In the porous sintered body, preferably, a primary particle having a particle diameter of more than 100 μm is not observed in any cross section. More preferably, a primary particle having a particle diameter of more than 50 μm does not exist.

In this way, by suppressing growth of a crystal particle, it is possible to maintain the pore structure having such fine pores as described above, and heat insulating performance at a high temperature is maintained.

A method for manufacturing the heat insulating material according to the embodiment of the present invention is not particularly limited. A well-known method for manufacturing a porous sintered body can be applied. Forming and adjusting the pore structure can be performed, for example, by adding a pore forming material or a foaming agent.

The heat insulating material according to the embodiment of the present invention includes a porous sintered body formed of $MgAl_2O_4$ and having a porosity of 60% or more and less than 73%. In the heat insulating material according to the embodiment of the present invention, the pores having a pore diameter of 0.8 μm or more and less than 10 μm occupy 30 vol % or more and less than 60 vol % of the total pore volume, the pores having a pore diameter of 0.01 μm or more and less than 0.8 μm occupy 30 vol % or more and less than 60 vol % of the total pore volume, and the thermal conductivity at 1000° C. or higher and 1500° C. or lower does not exceed 1.5 times the thermal conductivity at 20° C. or higher and lower than 1000° C.

The porous sintered body according to the embodiment of the present invention is formed of spinel $MgAl_2O_4$ (magnesia-spinel). The spinel porous sintered body has small change in a shape or a size of a pore generated by particle growth and bonding of grain boundaries at a high temperature, and can maintain an effect of suppressing change in the thermal conductivity for a long period of time. Particularly, $MgAl_2O_4$ has high structural stability and an isotropic crystal structure in a high temperature region of 1000° C. or higher. Therefore, $MgAl_2O_4$ does not cause abnormal particle growth or contraction even when exposed to a high temperature.

Therefore, $MgAl_2O_4$ can maintain a specific pore structure which is a characteristic of the present invention, and is suitable for a heat insulating material used at a high temperature. The above-described chemical composition and spinel structure can be measured and identified, for example, by powder X-ray diffractometry.

It is assumed that the porosity of the porous sintered body according to the embodiment of the present invention is 60% or more and less than 73%. When the porosity is less than 60%, a ratio occupied by a base material part including $MgAl_2O_4$ in the porous sintered body is high. Therefore, the conductive heat transfer is increased, and the thermal conductivity may not be easily lowered. On the other hand, when the porosity is 73% or more, the ratio occupied by the base material part including $MgAl_2O_4$ in the porous sintered body is relatively low. Therefore, the porous sintered body is fragile and sufficient strength may not be obtained.

The porosity is calculated according to JIS R 2614 "Testing method for specific gravity and true porosity of insulating fire bricks."

In the pore structure of the porous sintered body, the pores having a pore diameter of 0.8 μm or more and less than 10 μm occupy 30 vol % or more and less than 90 vol %, preferably 30 vol % or more and less than 60 vol %, of the total pore volume, the pores having a pore diameter of 0.01 μm or more and less than 0.8 μm occupy 10 vol % or more and less than 60 vol %, preferably 30 vol % or more and less than 60 vol % of the total pore volume.

Most of the pores of the porous sintered body are small pores having a pore diameter of less than 10 μm. When there are many pores having a pore diameter of 10 μm or more, the scattering effect of infrared rays may be reduced, an influence by the radiation heat transfer may be increased, and a sufficient heat insulating effect may not be easily obtained at a high temperature. Most of the pores included in the porous sintered body are small pores having a pore diameter of less than 10 μm. Therefore, the heat insulating material to be obtained can obtain both thermal conductivity of 0.45 W/(m·K) or less and compressive strength of 1 MPa or more.

The porous sintered body more preferably has at least one peak of a pore-diameter distribution in a range of the pore diameter of 0.8 μm or more and less than 10 μm. By having a peak of a pore-diameter distribution in a range of the pore diameter of 0.8 μm or more and less than 10 μm, the porous sintered body can cause scattering of infrared rays effectively, can suppress the influence by the radiation heat transfer at a high temperature, and can exhibit an excellent heat insulating effect.

Of the pores of the porous sintered body, the pores having a pore diameter of 0.01 μm or more and less than 0.8 μm (hereinafter, also referred to as "fine pores") occupy 10 vol % or more and less than 60 vol %, preferably 30 vol % or more and less than 60 vol %, of the total pore volume.

Such fine pores exist at the above-described ratio, and the conductive heat transfer and gas heat transfer can be thereby suppressed in a structure having heat resistance.

When the ratio occupied by the fine pores in the total pore volume is less than 10 vol %, specifically less than 30 vol %, an influence by the conductive heat transfer is large and the thermal conductivity may be more than 0.45 W/(m·K). On the other hand, when the ratio occupied by the fine pores in the total pore volume is 60 vol % or more, the ratio occupied by the pores having a pore diameter of 0.8 μm or more and less than 10 μm is reduced. The scattering effect of infrared rays may be reduced, the influence by the radiation heat transfer may be increased, and the thermal conductivity at a high temperature may be high.

There is no problem even if the porous sintered body has a peak of a pore-diameter distribution in a range of the pore diameter of 10 μm or more. However, a large pore deteriorates heat insulating performance because of the radiation heat transfer. Therefore, the large pore is not preferable.

Ceramic fiber, a balloon, an aggregate, and a compact layer may be included in addition to the porous sintered body.

The pore-diameter distribution in the porous sintered body can be measured according to JIS R 1655 "Test methods for pore-diameter distribution of fine ceramic green body by mercury porosimetry."

It is assumed that the thermal conductivity of the heat insulating material, specifically the thermal conductivity at 1000° C. or higher and 1500° C. or lower does not exceed 1.5 times, preferably 1.2 times the thermal conductivity at 20° C. or higher and lower than 1000° C.

In this way, the heat insulating material having thermal conductivity the increase of which is suppressed in a high temperature region maintains, also in a high temperature region of 1000° C. or higher, a heat insulating effect equivalent to that in a low temperature region lower than 1000° C.

In the heat insulating material, the thermal conductivity in a high temperature region of 1000° C. or higher and 1500° C. or lower is 0.45 W/(m·K) or less, preferably 0.40 W/(m·K) or less. Such a heat insulating material in which the thermal conductivity is not increased but suppressed even in a high temperature region of 1000° C. or higher has a heat insulating effect with small change even when used in a high temperature region.

The method for manufacturing the heat insulating material according to the embodiment of the present invention is not particularly limited. A well-known method for manufacturing a porous sintered body can be applied. Forming and adjusting the pore structure can be performed, for example, by adding a pore forming material or a foaming agent.

EXAMPLES

Hereinafter, the present invention will be described more specifically based on Examples. However, the present invention is not limited by the following Examples.

Example 1

Mixing was performed at a ratio of 11 mol of hydraulic alumina powder (BK-112, manufactured by Sumitomo Chemical Co., Ltd.) to 9 mol of magnesium oxide powder (MGO11PB, manufactured by Kojundo Chemical Laboratory Co., Ltd.). Pure water equivalent in weight to a total weight of hydraulic alumina and magnesium oxide was added thereto. The resultant mixture was dispersed uniformly to prepare a slurry.

Then, a granular acrylic resin having a diameter of 10 μm was added to the slurry at a ratio of 50 vol % with respect to the slurry as a pore forming material for mixing. The resultant mixture was molded to obtain a molded body of 60 mm×70 mm×20 mm.

This molded body was fired at 1800° C. for three hours in the atmosphere to manufacture a porous sintered body.

A crystal phase of the porous sintered body obtained above was identified by X-ray diffraction (apparatus for X-ray diffraction: manufactured by Rigaku Corporation, RINT2500, X-ray source: CuKα, voltage: 40 kV, current: 0.3 A, scanning speed: 0.06°/s). As a result, a magnesia-spinel phase was observed.

In addition, a pore volume of this porous sintered body was measured using a mercury porosimeter (manufactured by Shimadzu Corporation, Autopore IV9500). FIG. 1 illustrates a pore-diameter distribution of this porous sintered body.

Example 2 and Comparative Examples 1 and 2

In Example 1, the mixing ratio of magnesium oxide and the adding ratio of pure water were not changed, but the diameter and the adding amount of the pore forming material, the firing temperature, and the firing time were appropriately changed. Porous sintered bodies having pore structures illustrated in Example 2 and Comparative Examples 1 and 2 in the following Table 1 were manufactured by a method similar to that in Example 1 except for the diameter and the adding amount of the pore forming material, the firing temperature, and the firing time.

Comparative Example 3

A commercially available alumina heat insulating fire brick (heat-resistant temperature: 1650° C.) was used as Comparative Example 3.

A pore volume of each of the porous sintered bodies or the heat insulating brick according to Examples and Comparative Examples was measured using a mercury porosimeter. FIG. 1 illustrates each pore-diameter distribution thereof.

The thermal conductivity of each of the porous sintered bodies or the heat insulating brick according to Examples and Comparative Examples was measured with reference to JIS R 2616. The compressive strength was evaluated with reference to JIS R 2615 "Testing method for compressive strength of insulating fire bricks."

Various evaluation results are illustrated all together in the following Table 1.

TABLE 1

|  | Porosity (%) | Pore volume ratio (vol %) | | Thermal conductivity | | | Compressive strength (MPa) |
|---|---|---|---|---|---|---|---|
|  |  | 0.01 μm to 0.8 μm | 0.8 μm to 10 μm | 20° C. to 1000° C. Minimum value: A (W/m · K) | 1000° C. to 1500° C. Maximum value: B (W/m · K) | B/A |  |
| Example 1 | 67 | 10 | 79 | 0.39 | 0.39 | 1.0 | 6.8 |
| Example 2 | 71 | 16 | 83 | 0.32 | 0.32 | 1.0 | 2.6 |
| Comparative Example 1 | 78 | 20 | 75 | 0.22 | 0.26 | 1.2 | 0.8 |
| Comparative Example 2 | 53 | 1 | 86 | 0.71 | 0.71 | 1.0 | 8.1 |
| Comparative Example 3 | 71 | 1 | 45 | 0.44 | 0.70 | 1.6 | 6.1 |

Figure 2:
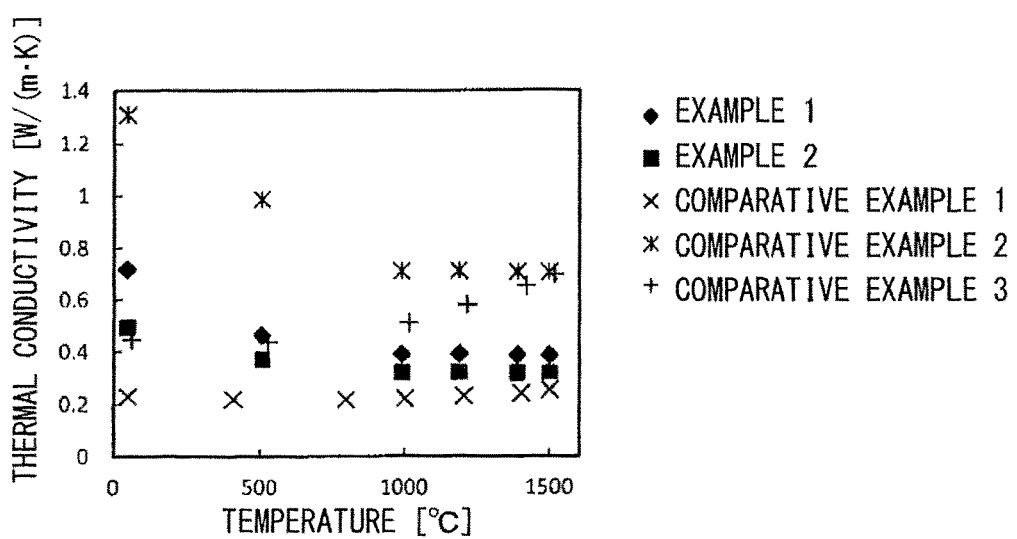
FIG. 2 is a graph illustrating a relation between temperature and thermal conductivity of each of the porous sintered bodies or the heat insulating brick according to Examples and Comparative Examples.

From the evaluation results illustrated in Table 1 and FIGS. 1 and 2, it was confirmed that the thermal conductivity at 1000° C. or higher and 1500° C. or lower was 0.4 W/(m·K) or less and that the increase of the thermal conductivity was suppressed even in a high temperature region.

On the other hand, when fine pores having a pore diameter of 0.01 μm or more and less than 0.8 μm occupied 20 vol % or more of the total pore volume (Comparative Example 1), the thermal conductivity was low but the compressive strength was low. When the fine pores having a pore diameter of 0.01 μm or more and less than 0.8 μm occupied less than 10 vol % of the total pore volume (Comparative Example 2), the compressive strength was high but the thermal conductivity was much higher than that in Examples 1 and 2 both in a low temperature region of 20° C. or higher and lower than 1000° C. and in a high temperature region of 1000° C. or higher and 1500° C. or lower.

The commercially available heat insulating fire brick (Comparative Example 3) does not include such fine pores as in Examples 1 and 2. Therefore, the radiation heat transfer was increased as the temperature rose, and the thermal conductivity was increased largely.

By the way, while "molding is performed in a hydraulic state" in JP 2012-229139 A (refer to (Experiment 1) in Examples), simply "molding" is performed in an embodiment of the present invention (for example, refer to Example 1).

Specifically, in "molding" in the embodiment of the present invention, a well-known defoaming treatment is performed in a step for solidifying the slurry in a hydraulic state to remove a large pore, and thereafter, molding into a predetermined shape is performed. The reason is as follows. That is, as described above, in the present invention, the large pore deteriorates the heat insulating performance due to the radiation heat transfer, and existence of the pore having a pore diameter of more than 1000 μm is not preferable.

Here, it is possible to easily and visually confirm the pore having a pore diameter of more than 1000 μm, that is, the large pore. For example, the large pore was able to be confirmed visually in a sample No. 3-D in [Table 4] in JP 2012-229139 A, but was not able to be confirmed visually in the embodiment of the present invention.

In the embodiment of the present invention, the slurry is subjected to the well-known defoaming treatment, but the present invention is not limited thereto. If the large pore can be removed, many other well-known methods can be applied. As an example, press molding can be also applied.

For reference, when a ratio of each of a pore having a pore diameter of 0.8 μm or more and less than 10 μm and a pore having a pore diameter of 0.01 μm or more and less than 0.8 μm in porous ceramics in Examples 3 and 4 described in [Table 2] in JP 2013-209278 A is calculated, the pore having a pore diameter of 0.8 μm or more and less than 10 μm occupies 65% (Example 3 in [Table 2] in JP 2013-209278 A) and 62% (Example 4 in [Table 2] in JP 2013-209278 A) of the total pore volume, and the pore having a pore diameter of 0.01 μm or more and less than 0.8 μm occupies 32% (Example 3 in [Table 2] in JP 2013-209278 A) and 27% (Example 4 in [Table 2] in JP 2013-209278 A) of the total pore volume. These are all out of the range of the present invention.

While the firing temperature is 1300° C. or 1400° C. in Examples 3 and 4 in JP 2013-209278 A, the firing temperature is set to 1800° C. in the embodiment of the present invention. By raising the firing temperature, sintering proceeds between particles of $MgAl_2O_4$ and the particles are strongly bonded to each other. Therefore, it can be said that the compressive strength of the whole porous sintered body is improved. Here, the compressive strength in each of Examples 3 and 4 in JP 2013-209278 A was 0.9 MPa. (Refer to [Table 2] for various evaluation results of the porous ceramics in Examples 3 and 4.)

In the present invention, the firing temperature is set to 1800° C. However, in order to improve the compressive strength, if the firing temperature is 1500° C. or higher, it can be said that the compressive strength can be improved sufficiently compared with a firing temperature lower than 1500° C. in the porous sintered body having such a pore-diameter distribution as in the present invention.

In the present invention, the strength can be improved more suitably by decreasing the large pores and raising the firing temperature simultaneously and suitably. However, improving the strength and maintaining the low thermal conductivity are contrary to each other. Also in the present invention, by optimizing these three conditions including adjusting the pore volume ratio, the heat insulating material having desired characteristics can be obtained.

Example 3

Mixing was performed at a ratio of 11 mol of hydraulic alumina powder (BK-112, manufactured by Sumitomo Chemical Co., Ltd.) to 9 mol of magnesium oxide powder (MGO11PB, manufactured by Kojundo Chemical Laboratory Co., Ltd.). Pure water equivalent in weight to a total weight of hydraulic alumina and magnesium oxide was added thereto. The resultant mixture was dispersed uniformly to prepare a slurry. Then, a granular acrylic resin having a diameter of 10 μm was added to the slurry at a ratio of 50 vol % with respect to the slurry as a pore forming material for mixing. The resultant mixture was molded to obtain a molded body of 60 mm×70 mm×20 mm. This molded body was fired at 1600° C. for three hours in the atmosphere to manufacture a porous sintered body.

A crystal phase of the porous sintered body obtained above was identified by powder X-ray diffractometry (apparatus for X-ray diffraction: manufactured by Rigaku Corporation, RINT2500, X-ray source: CuKα, voltage: 40 kV, current: 0.3 A, scanning speed: 0.06°/s). As a result, a magnesia-spinel phase was observed.

Figure 3:
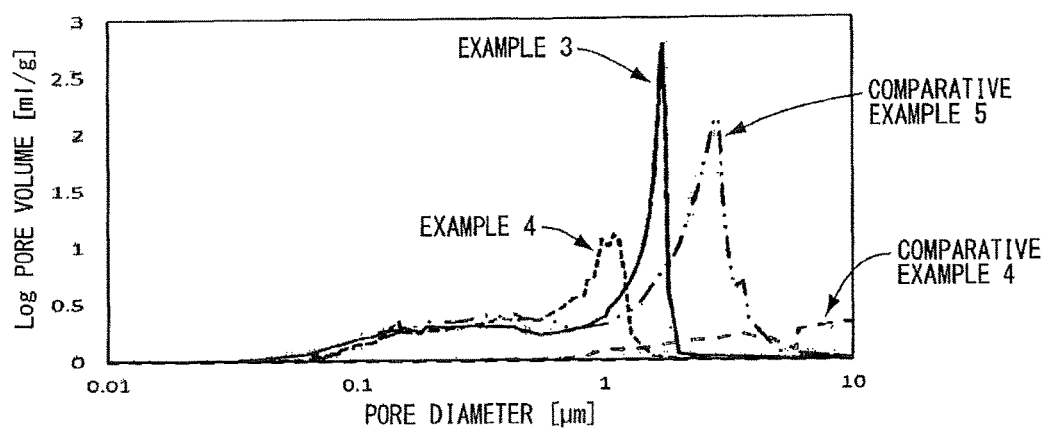
FIG. 3 is a graph illustrating a pore-diameter distribution of each of the porous sintered bodies or the heat insulating brick according to Examples and Comparative Examples, measured by a mercury porosimeter.

In addition, a pore volume of this porous sintered body was measured using a mercury porosimeter (manufactured by Shimadzu Corporation, Autopore IV9500). FIG. 3 illustrates a pore-diameter distribution thereof.

Comparative Example 4

A commercially available alumina heat insulating fire brick (heat-resistant temperature: 1650° C.) was used as Comparative Example 4.

Examples 4 to 6, and Comparative Example 5

In Example 3, the mixing ratio of magnesium oxide and the adding ratio of pure water were not changed, but the diameter and the adding amount of the pore forming material, the firing temperature, and the firing time were appropriately changed. Porous sintered bodies having pore structures illustrated in Examples 4 to 6 and Comparative Example 5 in the following Table 2 were manufactured by a method similar to that in Example 3 except for the diameter and the adding amount of the pore forming material, the firing temperature, and the firing time.

A pore volume of each of the porous sintered bodies or the heat insulating brick in Example 3 and Comparative Examples 4 and 5 was measured using a mercury porosimeter. FIG. 3 illustrates each pore-diameter distribution thereof.

Figure 4:
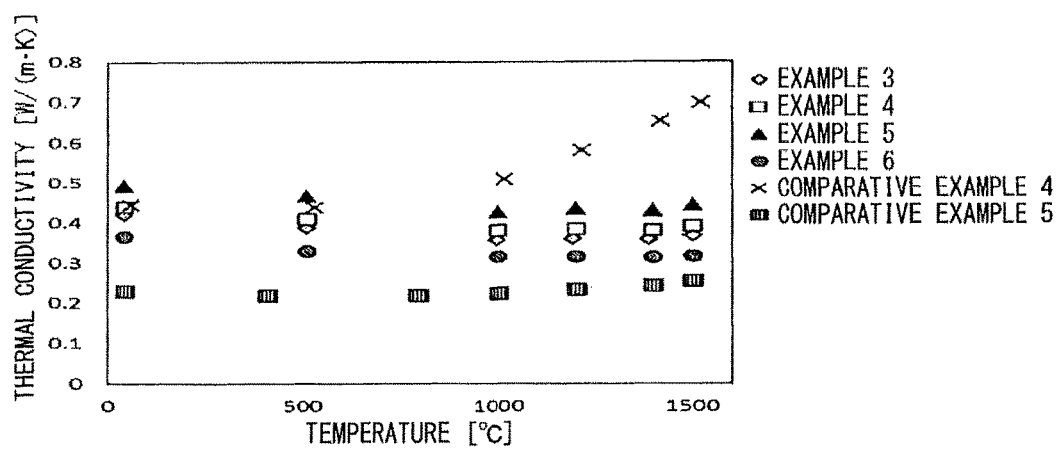
FIG. 4 is a graph illustrating a relation between temperature and thermal conductivity of each of the porous sintered bodies or the heat insulating brick according to Examples and Comparative Examples.

Specific gravity of each of the porous sintered bodies or the heat insulating brick according to Examples and Comparative Examples was measured with reference to JIS R 2614 "Testing method for specific gravity and true porosity of insulating fire bricks." The thermal conductivity of each of the porous sintered bodies or the heat insulating brick according to Examples and Comparative Examples was measured with reference to JIS R 2616. FIG. 4 illustrates each thermal conductivity thereof. The compressive strength was evaluated with reference to JIS R 2615 "Testing method for compressive strength of insulating fire bricks." Various evaluation results are illustrated all together in the following Table 2.

TABLE 2

| | Porosity | Specific gravity | Pore volume ratio (vol %) 0.01 µm to 0.8 µm | Pore volume ratio (vol %) 0.8 µm to 10 µm | Thermal conductivity (W/(m · K)) at 1000° C. | Thermal conductivity (W/(m · K)) at 1200° C. | Thermal conductivity (W/(m · K)) at 1400° C. | Thermal conductivity (W/(m · K)) at 1500° C. | Minimum value A of thermal conductivity at 20° C. to 1000° C. (W/(m · K)) | Maximum value B of thermal conductivity at 1000° C. to 1500° C. (W/(m · K)) | B/A | Compressive strength (MPa) |
|---|---|---|---|---|---|---|---|---|---|---|---|---|
| Example 3 | 68% | 1.16 | 37% | 52% | 0.36 | 0.36 | 0.36 | 0.37 | 0.36 | 0.37 | 1.0 | 6.2 |
| Example 4 | 66% | 1.22 | 50% | 41% | 0.38 | 0.38 | 0.38 | 0.39 | 0.38 | 0.39 | 1.0 | 7.0 |
| Example 5 | 62% | 1.38 | 58% | 31% | 0.43 | 0.43 | 0.43 | 0.45 | 0.43 | 0.45 | 1.0 | 9.0 |
| Example 6 | 72% | 1.00 | 31% | 56% | 0.32 | 0.32 | 0.31 | 0.32 | 0.32 | 0.32 | 1.0 | 4.2 |
| Comparative Example 4 | 71% | 0.91 | — | — | 0.51 | 0.58 | 0.65 | 0.70 | 0.44 | 0.70 | 1.6 | 6.1 |
| Comparative Example 5 | 78% | 0.8 | 20% | 75% | 0.22 | 0.23 | 0.23 | 0.24 | 0.22 | 0.24 | 1.1 | 0.8 |

In Table 2, "0.01 to 0.8 µm" means "0.01 µm or more and less than 0.8 µm." "0.8 to 10 µm" means "0.8 µm or more and less than 10 µm."

From the evaluation results illustrated in Table 2, in Examples 3 to 6, it was confirmed that the thermal conductivity was hardly changed even when the temperature rose and that the increase of the thermal conductivity was suppressed even in a high temperature region.

On the other hand, the commercially available heat insulating fire brick (Comparative Example 1) does not include such fine pores as in Examples 3 to 6. Therefore, the radiation heat transfer was increased as the temperature rose, and the thermal conductivity was increased largely.

When the fine pores having a pore diameter of 0.01 µm or more and less than 0.8 µm occupied less than 30 vol % of the total pore volume (Comparative Example 2), the thermal conductivity was low but the compressive strength was low.

In Example 5, the thermal conductivity is more than 0.4 W/(m·K) at 1000° C. or higher and 1500° C. or lower, but the compressive strength is 9.0 MPa. That is, it can be said that the porous sintered body in Example 5 is better than those in Examples 3, 4, and 6 in terms of the strength.

In the present invention, when the pores having a pore diameter of 0.01 µm or more and less than 0.8 µm occupy more than 50 vol % of the total pore volume as in Example 5, it can be said that the compressive strength is increased instead of increasing the thermal conductivity.

In Example 6, the thermal conductivity is a low value of 0.31 to 0.32 W/(m·K) at 1000° C. or higher and 1500° C. or lower, but the compressive strength is 4.2 MPa. The strength is slightly unfavorable compared with that in Examples 3 to 5.

In the present invention, when the pores having a pore diameter of 0.01 µm or more and less than 0.8 µm occupy approximately 30 vol % of the total pore volume as in Example 6, it can be said that the compressive strength is decreased instead of decreasing the thermal conductivity.

From these facts, in the present invention, the thermal conductivity and the compressive strength are in a trade-off relationship when the ratio occupied by the pores having a pore diameter of 0.01 µm or more and less than 0.8 µm in the total pore volume is controlled. However, it can be said that these facts indicate that optimum characteristics are obtained according to purposes of use.

By the way, the sample No. 3-D in [Table 4] in JP 2012-229139 A has a porosity and a pore volume ratio in a range of the present invention. The firing temperature thereof is also the same as that in the embodiment of the present invention. However, the compressive strength is 1.9 MPa, which is inferior to that in the embodiment of the present invention. This is caused by such a difference in the method for molding that simply "molding" is performed in the embodiment of the present invention (for example, refer to Example 3) while "molding is performed in a hydraulic state" in JP 2012-229139 A (refer to (Experiment 1) in Examples).

Specifically, in "molding" in the embodiment of the present invention, a well-known defoaming treatment is performed in a step for solidifying a slurry in a hydraulic state to remove a large pore, and thereafter, molding into a predetermined shape is performed. The reason is as follows. That is, as described above, in the present invention, the large pore deteriorates the heat insulating performance due to the radiation heat transfer, and existence of the pore having a pore diameter of more than 1000 µm is not preferable.

Here, it is possible to easily and visually confirm the pore having a pore diameter of more than 1000 µm, that is, the large pore. For example, the large pore was able to be confirmed visually in the sample No. 3-D in [Table 4] in JP 2012-229139 A, but was not able to be confirmed visually in the embodiment of the present invention.

In the embodiment of the present invention, the slurry is subjected to the well-known defoaming treatment, but the present invention is not limited thereto. If the large pore can be removed, many other well-known methods can be applied. As an example, press molding can be also applied.

For reference, when a ratio of each of a pore having a pore diameter of 0.8 µm or more and less than 10 µm and a pore having a pore diameter of 0.01 µm or more and less than 0.8 µm in porous ceramics in Examples 3 and 4 described in [Table 2] in JP 2012-229139 A is calculated, the pore having a pore diameter of 0.8 µm or more and less than 10 µm occupies 65% (Example 3 in [Table 2] in JP 2012-229139 A) and 62% (Example 4 in [Table 2] in JP 2012-229139 A) of the total pore volume, and the pore having a pore diameter of 0.01 µm or more and less than 0.8 µm occupies 32% (Example 3 in [Table 2] in JP 2012-229139 A) and 27% (Example 4 in [Table 2] in JP 2012-229139 A) of the total pore volume. These are all out of the range of the present invention.

While the firing temperature is 1300° C. or 1400° C. in Examples 3 and 4 in JP 2012-229139 A, the firing temperature is set to 1600° C. in the embodiment of the present invention. By raising the firing temperature, sintering proceeds between particles of $MgAl_2O_4$ and the particles are strongly bonded to each other. Therefore, it can be said that the compressive strength of the whole porous sintered body is improved. Here, the compressive strength in each of Examples 3 and 4 in JP 2012-229139 A was 0.9 MPa (Refer to [Table 2] for various evaluation results of the porous ceramics in Examples 3 and 4).

In the present invention, the firing temperature is set to 1600° C. However, in order to improve the compressive strength, if the firing temperature is 1600° C. or higher, it can be said that the compressive strength can be improved sufficiently compared with a firing temperature lower than 1600° C. in the porous sintered body having such a pore-diameter distribution as in the present invention.

In the present invention, the strength can be improved more suitably by decreasing the large pores and raising the firing temperature simultaneously and suitably. However, improving the compressive strength and maintaining low thermal conductivity are contrary to each other. Also in the present invention, by optimizing these three conditions including adjusting the pore volume ratio, the heat insulating material having desired characteristics can be obtained.

What is claimed is:

1. A heat insulating material comprising a porous sintered body formed of $MgAl_2O_4$ and having a porosity of 60% or more and less than 73% in accordance with JIS R2614, wherein the porous sintered body has
   pores having a pore diameter of 0.8 µm or more and less than 10 µm occupying 70 vol % or more and less than 90 vol % of the total pore volume;
   pores having a pore diameter of 0.01 µm or more and less than 0.8 µm occupying 10 vol % or more and less than 20 vol % of the total pore volume;
   a thermal conductivity at 20° C. to 1500° C. of 0.40 W/(m·K) or less; and
   the thermal conductivity at 1000° C. to 1500° C. not exceeding 1.5 times the thermal conductivity at 20° C. or higher and lower than 1000° C.; and
   the heat insulating material has a compressive strength of 2 MPa or more.

2. The heat insulating material according to claim 1, wherein the thermal conductivity of the porous sintered body at 1000° C. to 1500° C. does not exceed 1.2 times the thermal conductivity at 20° C. or higher and lower than 1000° C.

3. A heat insulating material comprising a porous sintered body formed of $MgAl_2O_4$ and having a porosity of 60% or more and less than 73% in accordance with JIS R2614, wherein the porous sintered body has
   pores having a pore diameter of 0.8 µm or more and less than 10 µm occupying 30 vol % or more and less than 60 vol % of the total pore volume;
   pores having a pore diameter of 0.01 µm or more and less than 0.8 µm occupying 30 vol % or more and less than 60 vol % of the total pore volume;
   a thermal conductivity at 20° C. to 1500° C. of 0.40 W/(m·K) or less; and
   the thermal conductivity at 1000° C. to 1500° C. not exceeding 1.5 times the thermal conductivity at 20° C. or higher and lower than 1000° C.; and
   the heat insulating material has a compressive strength of 2 MPa or more.

4. The heat insulating material according to claim 3, wherein the thermal conductivity of the porous sintered body at 1000° C. to 1500° C. does not exceed 1.2 times the thermal conductivity at 20° C. or higher and lower than 1000° C.

* * * * *